United States Patent [19]

Tamai et al.

[11] Patent Number: 4,931,531

[45] Date of Patent: Jun. 5, 1990

[54] POLYIMIDE AND HIGH-TEMPERATURE ADHESIVE THEREOF

[75] Inventors: Shoji Tamai; Masahiro Ohta, both of Yokohama; Saburo Kawashima, Yokosuka; Katsuaki Iiyama, Odawara; Hideaki Oikawa, Yokohama; Akihiro Yamaguchi, Kamakura, all of Japan

[73] Assignee: Mitsui Toatsu Chemicals, Incorporated, Tokyo, Japan

[21] Appl. No.: 210,789

[22] Filed: Jun. 24, 1988

[30] Foreign Application Priority Data

Jul. 2, 1987 [JP] Japan .................. 62-163940
Jul. 2, 1987 [JP] Japan .................. 62-163941

[51] Int. Cl.$^5$ ............... C08G 8/02; C08G 14/00; C08G 8/04; C08G 69/26
[52] U.S. Cl. .................. 528/172; 528/125; 528/129; 528/173; 528/185; 528/188; 528/353
[58] Field of Search ............. 528/125, 129, 172, 173, 528/185, 188, 353

[56] References Cited

PUBLICATIONS

Chemical Abstracts, vol. 108, 1988: 141730y, Moldings for Printed Circuit Boards, Hiroaki et al.

*Primary Examiner*—John Kight, III
*Assistant Examiner*—T. Mason
*Attorney, Agent, or Firm*—Burns, Doane, Swecker & Mathis

[57] ABSTRACT

This invention relates to a novel polyimide which is high-temperature resistant and capable of being molded in a fused state. This invention also relates to a high-temperature adhesive using the polyimide.

The polyimide consists essentially of recurring units of the formula:

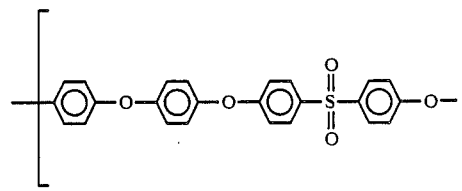

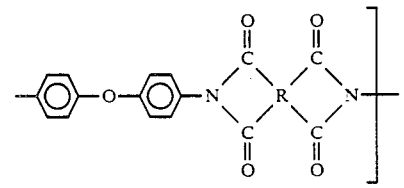

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member.

The polyimide can be prepared by reacting bis[4-(4-aminophenoxy)phenoxy)phenyl] sulfone with a tetracarboxylic dianhydride in an organic solvent and imidizing the resultant polyamic acid.

Various tetracarboxylic dianhydrides can be used and preferred dianhydride are pyromellitic dianhydride, 3,3',4,4'-benzophenonetetracarboxylic dianhydride, bis(3,4-diarboxyphenyl) ether dianhydride, 3,3',4,4'-biphenyltetracarboxylic dianhydride, and 4,4'-(p-phenylenedioxy)diphthalic dianhydride.

10 Claims, 2 Drawing Sheets

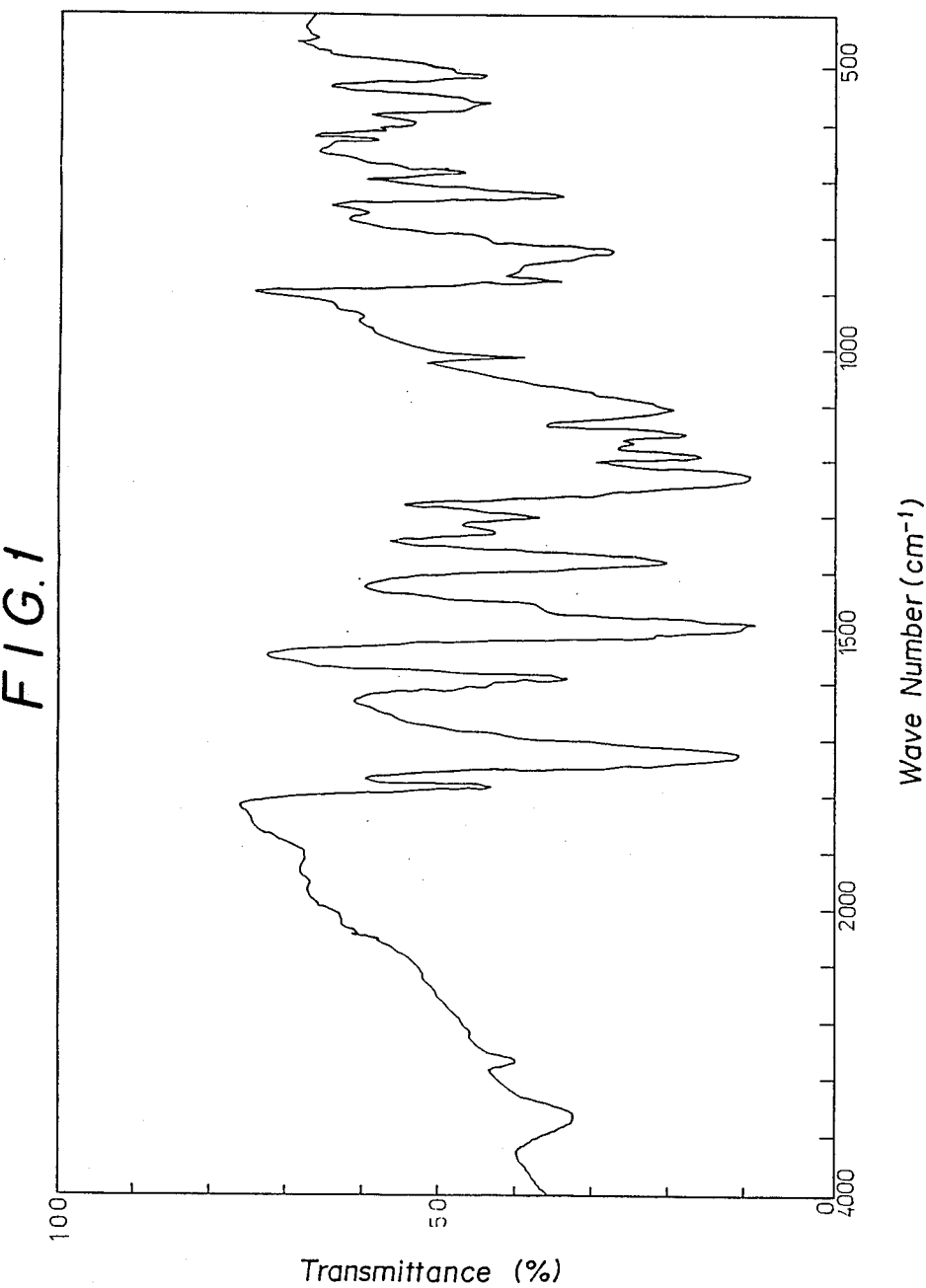

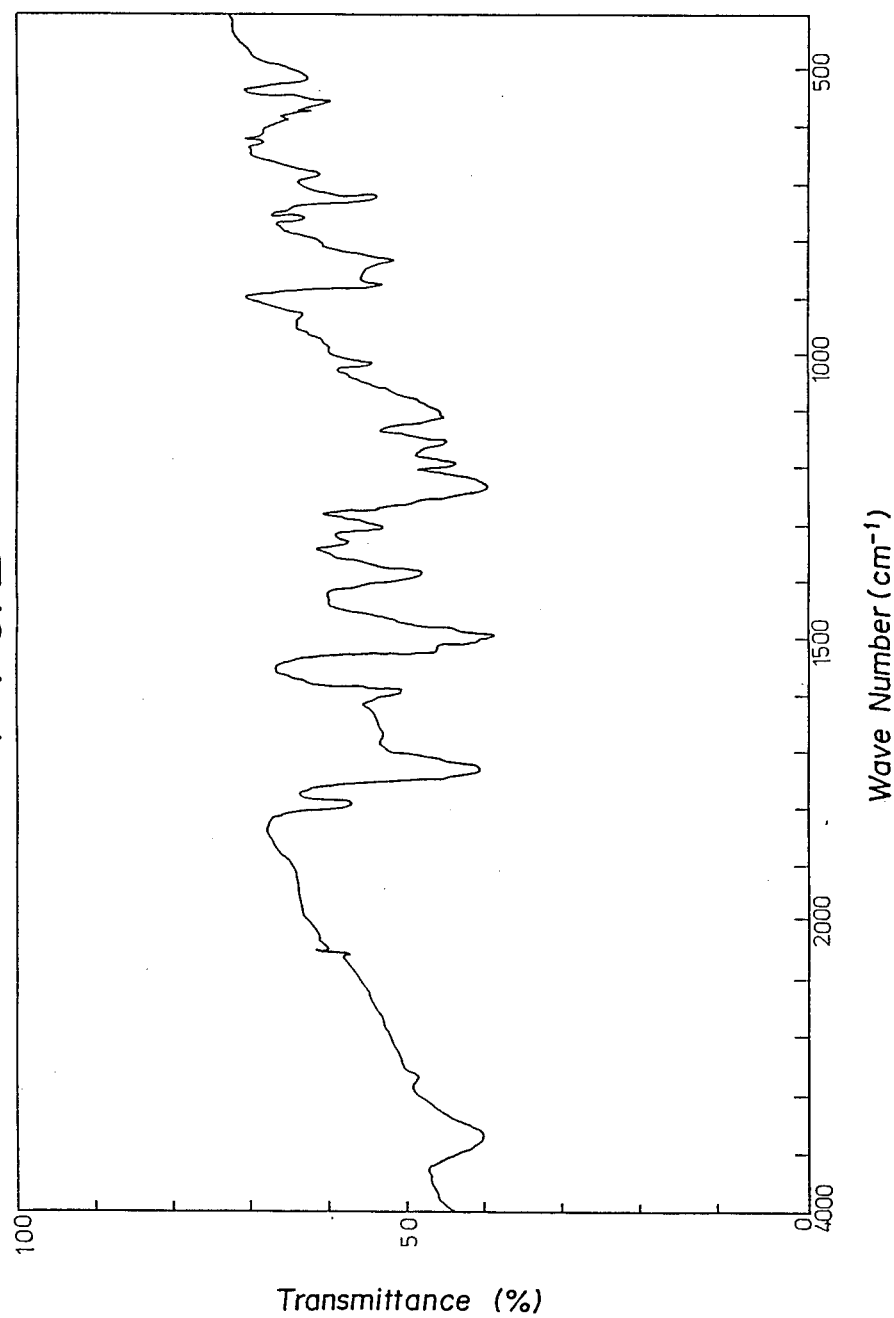

POLYIMIDE AND HIGH-TEMPERATURE ADHESIVE THEREOF

BACKGROUND OF THE INVENTION

This invention relates to a novel polyimide which is high-temperature resistant and capable of being molded in a fused state, and also relates to a high-temperature resistant adhesive using the polyimide.

Polyimides obtained by the reaction of tetracarboxylic dianhydrides with diamines have so far been excellent in various properties and outstanding in high-temperature resistance. Therefore, the polyimides are expected to be widely used in the future for various fields where high-temperature resistance is required.

Many polyimides which have been developed to date exhibit excellent properties. Various polyimides, however, have an disadvantage in processing ability in that the polyimides have no glass transition temperature, even though they are excellent in high-temperature resistance, and must be processed by such methods as sinter molding when they are used as molding materials.

Various polyimides have a drawback of high water absorption which gives adverse effects on dimensional stability, insulative properties and solder heat resistance of molded products when they are used as materials for electric and electronic parts.

On the other hand, polyimide resins having excellent processing ability have also been developed. These resins, however, have low glass transition temperatures and are also soluble in halogenated hydrocarbons such as methylene chloride, and are thereby unsatisfactory in many cases from a high-temperature resistance and solvent resistance point of view.

SUMMARY OF THE INVENTION

The object of this invention is to provide a polyimide which has an excellent processing ability in addition to its substantially outstanding high-temperature stability and solvent resistance, a low water absorption, a good transparency, a prominent high-temperature resistant adhesion and is capable of being used for multipurpose applications.

BRIEF DESCRIPTION OF THE DRAWINGS

FIG. 1 and FIG. 2 are examples of infrared absorption spectra of the polyimide in this invention.

DETAILED DESCRIPTION OF THE INVENTION

The present inventors have conducted an intensive investigation in order to achieve the above stated object. As a result, a novel polyimide and a high-temperature resistant adhesive using thereof have been found.

That is, one aspect of the present invention is a polyimide consisting essentially of recurring units of the formula:

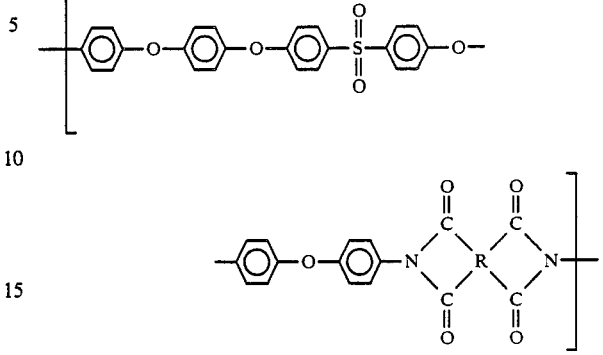

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member.

Another aspect of the present invention is a high-temperature resistant adhesive comprising a polyimide which consists essentially of recurring units of the formula:

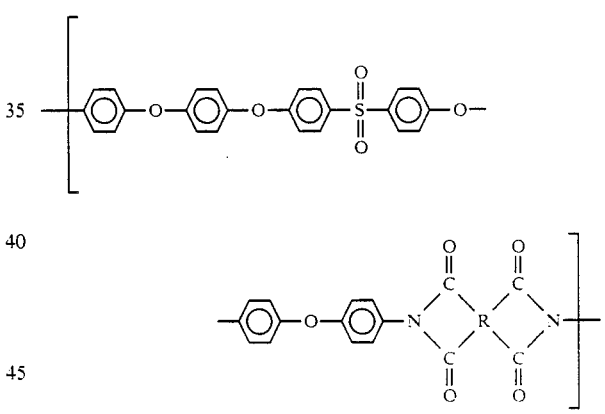

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member.

The polyimide of this invention is prepared by the use of a novel etherdiamine, bis[4-(4-(4-aminophenoxy)-phenoxy)phenyl]sulfone, represented by the following formula as a diamine component.

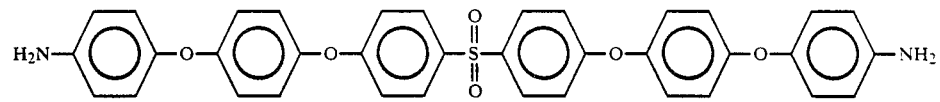

The etherdiamine is polymerized with at least one tetracarboxylic dianhydride and the resultant polyamic acid is subjected to a dehydration and ring closing reaction to obtain the novel polyimide.

The polyimide of this invention is characterized in that bis[4-(4-(4-aminophenoxy)phenoxy)phenyl sulfone is used as the diamine component. It is a novel thermoplastic polyimide having crystallinity in addition to high-temperature stability and solvent resistance as well as having an excellent processing ability and high-temperature resistant adhesive property.

An etherdiamine having a similar structure, bis[4-(4-aminophenoxy)phenyl]sulfone, which is represented by the following formula has been described [Georgel, Brode et al., J. Polym. Sci., Polym. Chem. Edition, 12, 575-587 (1974)].

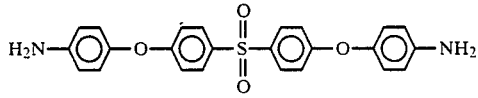

Polyimides prepared from this etherdiamine have no distinct glass transition temperature, exhibit almost no adhesive force and are Poor in processing ability.

On the other hand, the polyimide of this invention is outstanding in high-temperature resistance and can be processed by fusion molding.

That is, the polyimide of this invention is thermoplastic in addition to have the excellent high-temperature stability and solvent resistance. Thus the polyimide of this invention can be processed by fusion molding such as extrusion molding and injection molding and can be expected to be used as a base material for space and aeronautics elements as well as electric and electronic parts.

Furthermore, the polyimide has excellent high-temperature resistance due to its crystallinity and can be used for multipurpose applications such as in the preparation of high-temperature resistant fibers having high strength. Therefore, the polyimide of this invention is very valuable.

The polyimide of this invention is prepared by using the above stated etherdiamine as a raw material. Other diamines can also be used in combination with the etherdiamine within the range which has no adverse effect on the advantageous properties of the polyimide.

Examples of diamines which may be used in admixture with the etherdiamine include, m-phenylenediamine, o-phenylenediamine, p-phenylenediamine, m-aminobenzylamine, p-aminobenzylamine, bis(3-aminophenyl) ether, (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, (3-aminophenyl) sulfone, (3-aminophenyl) (4-aminophenyl) sulfone, bis(4-aminophenyl) sulfone, bis(4-aminophenyl) sulfone, 3,3'-diaminobenzophenone, 3,4'-diaminobenzophenone, 4,4'-diaminobenzophenone, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(4-aminophenoxy)phenyl]butane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfide, bis[4-(4-aminophenoxy)phenyl]sulfoxide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxybenzoyl]benzene, 4,4'-bis[4-(4-amino- , -dimethylbenzyl)phenoxy]benzophenone and bis[4-(4-(4-amino-,-dimethylbenzyl)phenoxy)phenyl]sulfone.

The polyimide of this invention can be prepared by the following process. In the first step, [4-(4-(4-aminophenoxy)phenoxy)phenyl]sulfone is polymerized with a tetracarboxylic dianhydride in an organic solvent to obtain polyamic acid.

The tetracarboxylic dianhydride used in the process of this invention is represented by the formula:

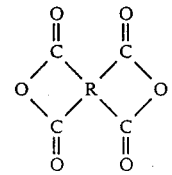

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member.

The tetracarboxylic dianhydride used in the method includes, for example, ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, bis(3,4-dicarboxyphenyl) ether dianhydride, bis(2,3-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, bis[4-(3,4-dicarboxyphenoxy)phenyl]sulfide dianhydride, 3,3'-(p-phenylenedioxy)diphthalic dianhydride, 4,4'-(p-phenylenedioxy)diphthalic dianhydride, 3,3'-(m-phenylenedioxy)diphthalic dianhydride and 4,4'-(m-phenylenedioxy)diphthalic dianhydride.

Examples of preferred tetracarboxylic dianhydrides include pyromellitic dianhydride, 3,3',4,4'-benzophenonetetracarboxylic dianhydride, bis(3,4-dicarboxyphenyl) ether dianhydride, 3,3'4,4'-tetracarboxybiphenyl dianhydride and 4,4'-(p-phenylenedioxy)diphthalic dianhydride.

These tetracarboxylic dianhydrides may be used singly or in mixtures of two or more.

Illustrative examples of organic solvents which may be used in this invention include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, p-cresol, p-chlorophenol and anisole. These organic solvents may be used singly or in mixtures thereof.

The reaction temperature is normally 250° C. or less and is preferably 50° C. or less.

Any reaction pressure may be used and the reaction may be conducted at atmospheric pressure.

The reaction time depends upon the kinds of tetracarboxylic dianhydrides and solvents used as well as the reaction temperature. The reaction is usually conducted for sufficient time to complete the formation of the polyamic acid, and the time is normally 4-24 hours.

The polyamic acid consisting of recurring units represented by the following formula is formed by such reaction.

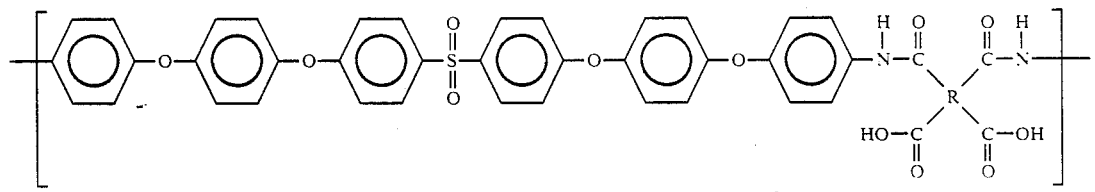

where R is the same as above.

The resultant polyamic acid is dehydrated by heating at 100°-400° C. or subjected to a chemical imidization to obtain the corresponding polyimide consisting of recurring units represented by the following formula:

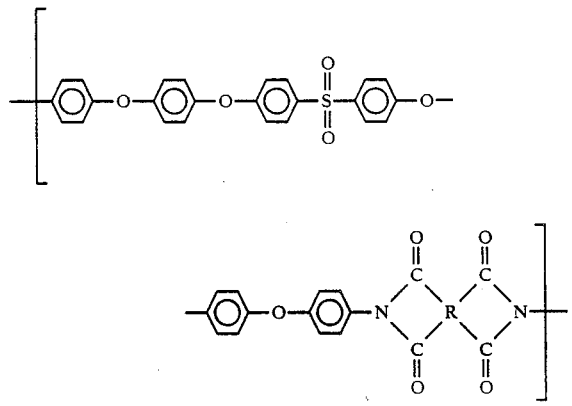

wheze R is the same as above.

The polyamic acid is generally formed at relatively low temperatures and followed by imidizing thermally or chemically.

The polyimide, however, can also be prepared by simultaneously conducting the formation of the polyamic acid and its thermal imidization reaction.

That is, the polyimide having recurring units of the above formula can also be prepared by suspending or dissolving bis[4-(4-(4-aminophenoxy)phenoxy)phenyl]-sulfone and the tetracarboxylic dianhydride in the organic solvent, and then carrying out the reaction by heating to conduct the formation of the polyamic acid and its dehydrating imidization at the same time.

Accordingly, the polyimide consisting of recurring units represented by the above formula can be obtained by using known processes.

The polyimide of this invention can be used as an adhesive by the following procedure.

The polyamic acid mentioned above is dehydrated thermally or chemically to obtain the polyimide in the form of, for example, a film or powder. The film or powder is inserted between substrates, pressed with a pressure of 1-1000 kg/cm² at a temperature of 50°-450° C. and then cured at a temperature of 100°-450° C. to obtain strongly bonded substrates.

No adverse effects are found even though a part of the polyamic acid group remains in the polyimide.

As an alternative process, a solution obtained by dissolving the aforementioned polyamic acid or the intact reaction mixture obtained by forming the polyamic acid in the organic solvent are used. Such solution is applied as a thin layer on the substrate to be bonded and preheated for the time required at 150°-450° C., preferably at 220°-300° C. to remove the excess solvent. The polyamic acid is converted to the polyimide by this procedure on the surface of the substrate. The treated surface of the substrate is then contacted with another substrate and pressed with a pressure of 1-1000 kg/cm² at a temperature of 50°-400° C. and cured at a temperature of 100°-450° C. This process is also very suitable for obtaining strongly bonded substrates.

When the polyimide of this invention is processed by fusion molding, other thermoplastic resins may be incorporated in a suitable amount depending upon the application so long as no adverse effects are found on the object of this invention. Illustrative examples of the thermoplastic resins which may be used include polyethylene polypropylene, polycarbonate, polyarylate, polyamide, polysulfone, polyethersulfone, polyetherketone, polyphenylene sulfide, polyamideimide, polyetherimide and modified polyphenylene oxide.

Fillers which are used for usual resin compositions may be employed in an amount which has no adverse effects on the object of this invention. The fillers which may be used include, for example, wear resistance improvers such as graphite, carborundum, quartz powder, molybdenum disulfide and fluororesins; reinforcing materials such as glass fiber, carbon fiber, boron fiber, silicon carbide fiber, carbon whisker, asbestos, metal fiber and ceramic fiber; flame retardants such as antimony trioxide, magnesium carbonate and calcium carbonate; electrical property improvers such as clay and mica; tracking resistance improvers such as asbestos, silica and graphite; acid resistance improvers such as barium sulfate, silica and calcium metasilicate; thermal conductivity improvers such as iron powder, zinc powder, aluminum powder and copper powder; and other miscellaneous additives such as glass beads, glass spheres, talc, diatomaceous earth, alumina, silas balloon, hydrated alumina, metal oxides and coloring agents.

EXAMPLES

This invention will hereinafter be described in detail, by way of examples, comparative examples and synthesis example.

Synthesis Example

Bis[4-(4-(4-aminophenoxy)phenoxy)phenyl]sulfone used in conducting the present invention was prepared by the following procedures.

A reaction vessel equipped with a stirrer, thermometer and reflux condenser was charged with 150.9 g (0.75 mole) of (4-aminophenyl) (4-hydroxyphenyl) ether, 42.8 g (0.73 mole) of 96% potassium hydroxide, 450 g of 1,3-dimethyl-2-imidazolidinone and 45 g of toluene. The mixture was heated with stirring in a nitrogen atmosphere and water generated in the reaction system was removed by a water separator upon refluxing toluene.

The temperature of the reaction mixture was lowered to less than 100° C. and a solution of 102.6 g (0.357 mole) of bis(4-chlorophenyl) sulfone in 205.2 g of 1,3-dimethyl-2-imidazolidinone was added dropwise. After the addition, the temperature was raised to 180°–190° C. and the reaction was carried out for 4 hours. After completing the reaction, the resultant mixture was cooled and poured into 500 g of methanol.

The separated light brown crystals were filtered, washed and recrystallized from 2-methoxyethanol to obtain 183 g (83.0% yield) of bis[4-(4-(4-aminophenoxy)phenoxy)phenyl]sulfone as white crystals having a melting point of 212°–214° C.

| Analytical results ($C_{36}H_{28}N_2O_6S$) | | | | |
|---|---|---|---|---|
| | C | H | N | S |
| Calculated (%) | 70.12 | 4.58 | 4.54 | 5.20 |
| Found (%) | 70.30 | 4.38 | 4.56 | 5.43 |
| IR (KBr, cm$^{-1}$) | 3450 and 3350 | | (amino radical) | |
| | 1240 | | (ether linkage) | |
| | 1150 | | (sulfone linkage) | |

EXAMPLE 1

A reaction vessel equipped with a stirrer, reflux condenser and nitrogen inlet tube was charged with 6.167 g (0.01 mole) of bis[4-(4-(4-aminophenoxy)phenoxy)phenyl]sulfone and 47.3 g of N,N-dimethylacetamide. To the mixture was added 2.18 g (0.01 mole) of pyromellitic dianhydride at the room temperature in a nitrogen atmosphere in portions so as to cause little temperature rise of the solution, and stirred for 20 hours at the room temperature. Polyamic acid thus obtained has an inherent viscosity of 1.52 dl/g.

The inherent viscosity was measured at 35° C. in a concentration of 0.5 g per 100 ml of N,N-dimethylacetamide solvent.

A part of the polyamic acid solution was cast on a glass plate and heated at 100° C., 200° C. and 300° C. each for an hour to obtain a polyimide film having a thickness of about 35 microns. The polyimide film had a tensile strength of 14.2 kg/mm$^2$ and elongation of 19.6% in accordance with ASTM D-882. The polyimide film also had a glass transition temperature of 290° C. in accordance with DSC method and a 5% weight loss temperature in air of 540° C. in accordance with DTA-TG. In addition, the polyimide film was inserted between cold rolled steel Panels (JIS G3141, SPCC/SD, 25×100×1.6 mm) which had been preheated at 130° C. and pressed for 5 minutes at 350° C. with a pressure of 20 kg/cm$^2$. The bonded specimen had a lap shear strength of 230 kg/mm$^2$ at the room temperature and 200 kg/mm$^2$ at 250° C. in accordance with JIS K-6848 and K-6850.

The film had an excellent water absorption of 1.03% after immersion in water at 23.5° C. for 24 hours in accordance with ASTM D-570-63.

The film was quite insoluble in halogenated hydrocarbons such as methylene chloride, chloroform, trichloroethylene and 1,1,2,2-tetrachloroethane.

COMPARATIVE EXAMPLE 1

The same reaction vessel as in Example 1 was charged with 4.32 g (0.01 mole) of bis[4-(4-aminophenoxy)phenyl]sulfone and 36.8 g of N,N-dimethylacetamide. To the mixture was added 2.18 g (0.01 mole) of pyromellitic dianhydride at the room temperature in a nitrogen atmosphere in portions so as to cause little temperature rise of the solution and stirred for about 20 hours. Polyamic acid thus obtained had an inherent viscosity of 1.60 dl/g.

A part of the polyamic acid solution was cast on a glass plate and heated at 100° C., 200° C. and 300° C. each for an hour to obtain a polyimide film having a thickness of about 35 microns. The film had a glass transition temperature of 326° C. and a 5% weight loss temperature in air of 525° C. In addition, the polyimide film was inserted between cold rolled steel panels which had been preheated at 130° C. and pressed for 5 minutes at 350° C. with a pressure of 20 kg/cm$^2$. The bonded specimen had a poor lap shear strength of 80 kg/cm$^2$ at the room temperature. The polyimide film had also a poor water absorption of 2.3%.

EXAMPLE 2

The same reaction vessel as in Example 1 was charged with 61.67 g (0.1 mole) of bis[4-(4-(4-aminophenoxy)phenoxy)phenyl]sulfone and 466.8 g of N,N-dimethylacetaside. To the mixture was added 20.7 g (0.095 mole) of pyromellitic dianhydride at the room temperature in a nitrogen atmosphere in portions so as to cause little temperature rise of the solution, and stirred for about 20 hours. Polyamic acid thus obtained had an inherent viscosity of 0.56 dl/g. To the polyamic acid solution was added 275 g of N,N-dimethylacetamide and then 40.4 g (0.4 mole) of triethylamine and 61.2 g (0.6 mole) of acetic anhydride were added dropwise with stirring in a nitrogen atmosphere.

After 2 hours from the completion of dropwise addition, polyimide started to precipitate as yellow powder. The mixture was further stirred for 20 hours and filtered to obtain polyimide powder. The powder was washed with methanol and dried at 180° C. for 5 hours under reduced pressure to obtain 77.2 g (98% yield) of the polyimide powder.

The polyimide powder had a glass transition temperature of 285° C., a melting point of 420° C. in accordance with DSC method, and a 5% weight loss temperature of 542° C.

In addition, FIG. 1 illustrates an infrared absorption spectrum of the polyimide power. In this spectrum, remarkable absorption is found in the neighborhood of following wave numbers. The characteristic absorption of imide is 1780 cm$^{-1}$ and 1720 cm$^{-1}$. That of ether linkage is 1240 cm$^{-1}$, and that of sulfone linkage is 1330 cm$^{-1}$ and 1150cm$^{-1}$.

The polyimide power had a crystallinity of 34% based on X-ray analysis. The polyimide powder was quite insoluble in halogenated hydrocarbons such as methylene chloride, chloroform, trichloroethylene and 1,1,2,2-tetrachloroethane and acetone.

The melt viscosity of the polyimide powder thus obtained was measured with a flow tester of Japan Polymer Society (Model CFT-500, a product of Shimadzu Seisakusho). An orifice having a diameter of 0.1 cm and a length of 1 cm was used under 100 kg load. The melt viscosity measured at 440° C. was $7.0 \times 10^3$ poise. The strand obtained was light yellow, transparent and very flexible.

The polyimide powder was compression molded at 440° C., for 30 minutes with a pressure of 300 kg/cm$^2$. The molded specimen had a notched Izod strength of 19 kg.cm/cm in accordance with ASTM D-256 and a heat distortion temperature (18.6 kg load) of 265° C. in accordance with ASTM D-648.

EXAMPLE 3

The same reaction vessel as in Example 1 was charged with 12.334 g (0.02 mole) of bis[4-(4-(4-aminophenoxy)phenoxy)phenyl]sulfone and 105.7 g of N,N-dimethylacetamide. To the mixture was added 6.311 g (0.0196 mole) of 3,3',4,4'-benzophenonetetracarboxylic dianhydride at the room temperature in a nitrogen atmosphere in portions so as to cause little temperature rise of the solution, and stirred for 20 hours at the room temperature. Polyamic acid thus obtained had an inherent viscosity of 1.10 dl/g.

A part of the polyamic acid solution was cast on a glass plate and heated at 100° C., 200° C. and 300° C. each for an hour to obtain a polyimide film having a thickness of about 35 microns. The polyimide film had a tensile strength of 12.7 kg/mm$^2$ and an elongation of 8.8%. The polyimide film also had a glass transition temperature of 242° C., a 5% weight loss temperature in air of 535° C. and water absorption of 0.98%.

The polyimide film was inserted between cold rolled steel panels which had been preheated at 130° C. and pressed at 320° C. for 5 minutes with a pressure of 20 kg/cm$^2$. The bonded specimen had a lap shear strength of 260 kg/cm$^2$ at the room temperature and 180 kg/cm$^2$ at 220° C.

Alternatively, the above polyamic acid solution was applied on a cold rolled steel panel and dried by heating at 100° C. and 220° C. each for an hour. The panel thus treated, was contacted with another steel panel and pressed at 320° C. for 5 minutes with a pressure of 20 kg/cm$^2$. The bonded specimen thus obtained had a lap shear strength of 265 kg/cm$^2$ at the room temperature.

A mixture of 50 g of the above polyamic acid solution and 25 g of N,N-dimethylacetamide was added dropwise with 3.23 g (0.032 mole) of triethylamine and 4.89 g (0.048 mole) of acetic anhydride with stirring in a nitrogen atmosphere at the room temperature. After 3 hours from the completion of addition, polyimide started to separate as yellow powder. Stirring was further continued for about 20 hours after the separation. The yellow powder was then filtered, washed with methanol and dried at 180° C. for 5 hours under reduced pressure. The polyimide powder thus obtained was 7.03 g (97.5% yield).

FIG. 2 illustrates an infrared absorption spectrum of the polyimide powder. In this spectrum, remarkable absorption is found in the neighborhood of following wave numbers. The characteristic absorption of imide is 1780 cm$^{-1}$ and 1720 cm$^{-1}$. That of ether linkage is 1240 cm$^{-1}$, and that of sulfone linkage is 1330 cm$^{-1}$ and 1150 cm$^{-1}$.

The polyimide powder was inserted between cold rolled steel panels and pressed at 320° C. for 5 minutes at a pressure of 20 kg/cm$^2$. The bonded specimen had a lap shear strength of 260 kg/cm$^2$.

EXAMPLE 4

The same reaction vessel as in Example 1 was charged with 6.167 g (0.01 mole) of bis[4-(4-(4-sinophenoxy)phenoxy)phenyl]sulfone and 52.5 g of N,N-dimethylacetamide. To the mixture was added 3.10 g (0.01 mole) of bis(3,4-dicarboxyphenyl) ether dianhydride at the room temperature in a nitrogen atmosphere by portions so as to cause little temperature rise of the solution, and stirred for 20 hours at the room temperature. Polyamic acid thus obtained had an inherent viscosity of 1.45 dl/g.

A part of the polyamic acid solution was cast on a glass plate and heated at 100° C., 200° C. and 300° C. each for an hour to obtain a polyimide film having a thickness of about 35 microns. The polyimide film had a tensile strength of 13.5 kg/mm$^2$ and an elongation of 14.0%.

The polyimide film had a glass transition temperature of 235° C., a 5% weight loss temperature in air of 525° C. and water absorption of 0.92%.

The polyimide film had a light transmittance of 88% and a haze of 0.52% in accordance with ASTM D-1003.

The polyimide film was inserted between cold rolled steel panels which had been preheated at 130° C. and pressed at 320° C. for 5 minutes with a pressure of 20 kg/cm$^2$. The bonded specimen had a lap shear strength of 275 kg/cm$^2$ at the room temperature.

EXAMPLE 5

The same reaction vessel as in Example 1 was charged with 6.167 g (0.01 mole) of bis[4-(4-(4-aminophenoxy)phenoxy)phenyl]sulfone and 51.4 g of N,N-dimethylacetamide. To the mixture was added 2.91 g (0.0099 mole) of 3,3',4,4'-biphenyltetracarboxylic dianhydride at the room temperature in a nitrogen atmosphere by portions so as to cause little temperature rise of the solution, and stirred for 20 hours at the room temperature. Polyamic acid thus obtained had an inherent viscosity of 1.10 dl/g.

A part of the polyamic acid solution was cast on a glass plate and heated at 100° C., 200° C. and 300° C. each for an hour to obtain a polyimide film having a thickness of about 35 microns. The polyimide film had a tensile strength of 14.5 kg/mm$^2$ and an elongation of 16.0%.

The polyimide film had a glass transition temperature of 261° C., a 5% weight loss temperature in air of 532° C. and water absorption of 0.90%.

The polyimide film had a light transmittance of 87% and an haze of 0.36%.

The polyimide film was inserted between cold rolled steel panels which had been preheated at 130° C. and pressed at 320° C. for 5 minutes with a pressure of 20 kg/cm². The bonded specimen had a lap shear strength of 245 kg/cm² at the room temperature.

EXAMPLE 6

The same reaction vessel as in Example 1 was charged with 6.167 g (0.01 mole) of bis[4-(4-(4-aminophenoxy)phenoxy)phenyl]sulfone and 57.5 g of N,N-dimethylacetamide. To the mixture was added 3.98 g (0.0099 mole) of 4,4'-(p-phenylenedioxy)diphthalic dianhydride at the room temperature in a nitrogen atmosphere in portions so as to cause little temperature rise of the solution, and stirred for 20 hours at the room temperature. Polyamic acid thus obtained had an inherent viscosity of 1.15 dl/g.

A part of the polyamic acid solution was casted on a glass plate and heated at 100° C., 200° C. and 300° C. each for an hour to obtain a polyimide film having a thickness of about 35 microns. The polyimide film had a tensile strength of 14.9 kg/mm² and an elongation of 18.5%.

The polyimide film had a glass transition temperature of 219° C., a 5% weight loss temperature in air of 535° C. and water absorption of 0.83%.

The polyimide film had a light transmittance of 89% and a haze of 0.32%.

The polyimide film was inserted between cold rolled steel panels which had been preheated at 130° C. and pressed at 320° C. for 5 minutes with a pressure of 20 kg/cm². The bonded specimen had a lap shear strength of 295 kg/cm² at the room temperature.

What is claimed is:

1. A polyimide consisting essentially of recurring units of the formula:

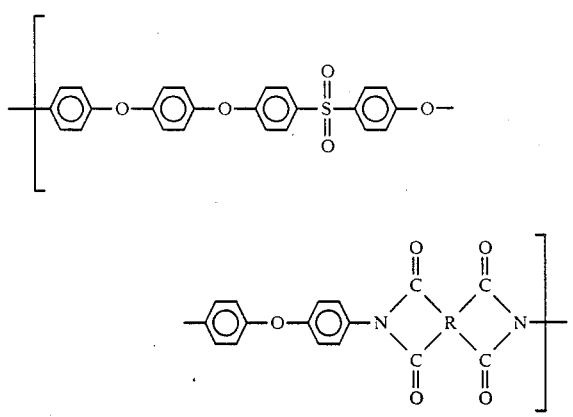

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member.

2. The polyimide as claimed in claim 1 wherein R is a tetravalent radical selected from the group consisting of

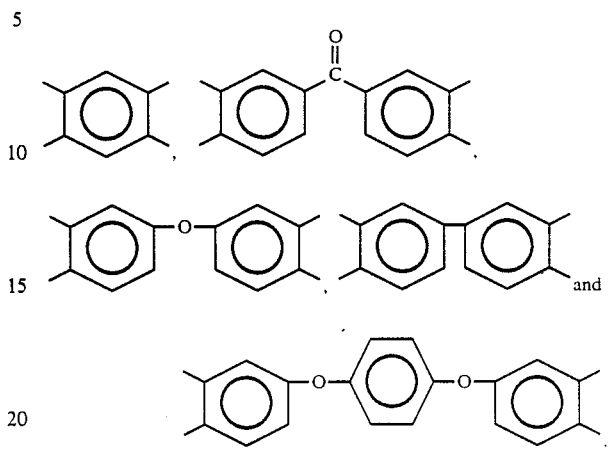

3. A high-temperature resistant adhesive comprising a polyimide consisting essentially of recurring units of the formula:

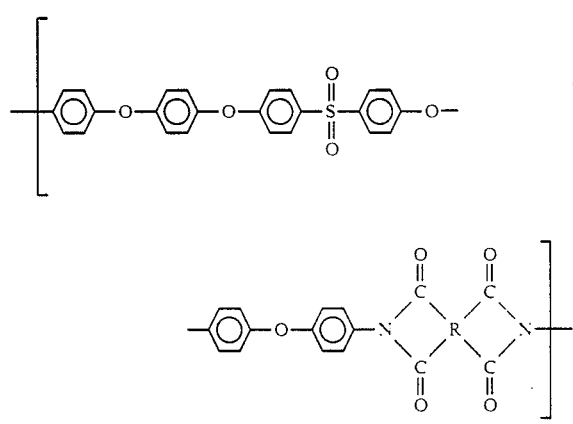

where R is a tetra-valent radical selected from the group consisting of an aliphatic radical having 2 or more carbon atoms, alicyclic radical, monoaromatic radical, condensed polyaromatic radical, and non-condensed polyaromatic radical wherein aromatic radicals are linked to one another directly or via a bridge member, and wherein said polyimide is cured at a temperature of from 100° C. to 450°.

4. The high-temperature resistant adhesive as claimed in claim 3 wherein R is a tetravalent radical selected from the group consisting of

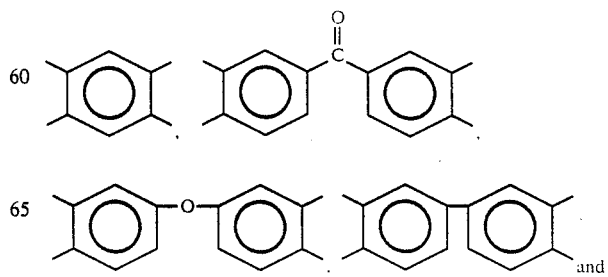

-continued

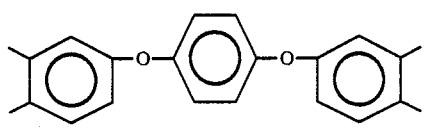

5. The polyimide as claimed in claim 1 wherein the polyimide is in the form of a film.

6. The polyimide as claimed in claim 1 wherein the polyimide is dissolved in an organic solvent to form a solution.

7. The polyimide as claimed in claim 1 wherein the polyimide is dissolve in an organic solvent to form a solution.

8. The high-temperature resistant adhesive as claimed in claim 3 wherein the adhesive is in the form of a film.

9. The high-temperature resistant adhesive as claimed in claim 3 wherein the adhesive is in the form of a powder.

10. The high-temperature resistant adhesive as claimed in claim 3 wherein the adhesive is in the form of a organic solvent-containing solution.

* * * * *

UNITED STATES PATENT AND TRADEMARK OFFICE
CERTIFICATE OF CORRECTION

PATENT NO. : 4,931,531
DATED : June 5, 1990
INVENTOR(S) : Shoji TAMAI et al

It is certified that error appears in the above-identified patent and that said Letters Patent is hereby corrected as shown below:

In Claim 6, column 14, lines 2-3, amend "dissolved in an organic solvent to form a solution" to --in the form of a powder--.

In Claim 7, column 14, line 5, amend "dissolve" to --dissolved--.

Signed and Sealed this

Fourteenth Day of January, 1992

Attest:

HARRY F. MANBECK, JR.

*Attesting Officer*  *Commissioner of Patents and Trademarks*